United States Patent [19]

Prill et al.

[11] 3,739,197

[45] June 12, 1973

[54] TRACK AND HOLD BUFFER AMPLIFIER

[75] Inventors: Robert S. Prill, Parsippany; Marshall A. Metzger, Totowa; Bradley C. Eaton, Pompton Plains, all of N.J.

[73] Assignee: The Singer Company, Little Falls, N.J.

[22] Filed: Nov. 8, 1971

[21] Appl. No.: 196,282

[52] U.S. Cl. ............... 307/238, 307/254, 328/151, 330/30 D

[51] Int. Cl. ............................................ H03k 17/00

[58] Field of Search ........................... 307/238, 235; 328/151; 330/30 D, 69

[56] References Cited

UNITED STATES PATENTS

| | | | |
|---|---|---|---|
| 3,207,998 | 9/1965 | Corney et al. | 328/151 |
| 3,512,083 | 5/1970 | McCutheon et al. | 328/151 |

*Primary Examiner*—John W. Huckert
*Assistant Examiner*—B. P. Davis
*Attorney*—S. A. Giarratana, Thomas W. Kennedy and Charles R. Lepchinsky

[57] ABSTRACT

An improved track and hold buffer amplifier is provided which is capable of tracking wide band video analog input signals, and which responds to an appropriate binary command to isolate itself from the analog input and effectively to hold the last received value of the analog input. The circuit to be described comprises a single wide band amplifier which provides the function of the two amplifiers required in the prior art closed loop system, and yet which has the stability of the prior art open loop type of system. A unique switching system is also provided which is non-floating, and which serves to switch the amplifier from its tracking mode into its isolation mode. The stray capacitance directly within the loop of the track and hold amplifier of the system provides the memory during the isolation hold mode, and this capacitance is used advantageously as the dominant 6 db/octave roll-off for the system.

7 Claims, 1 Drawing Figure

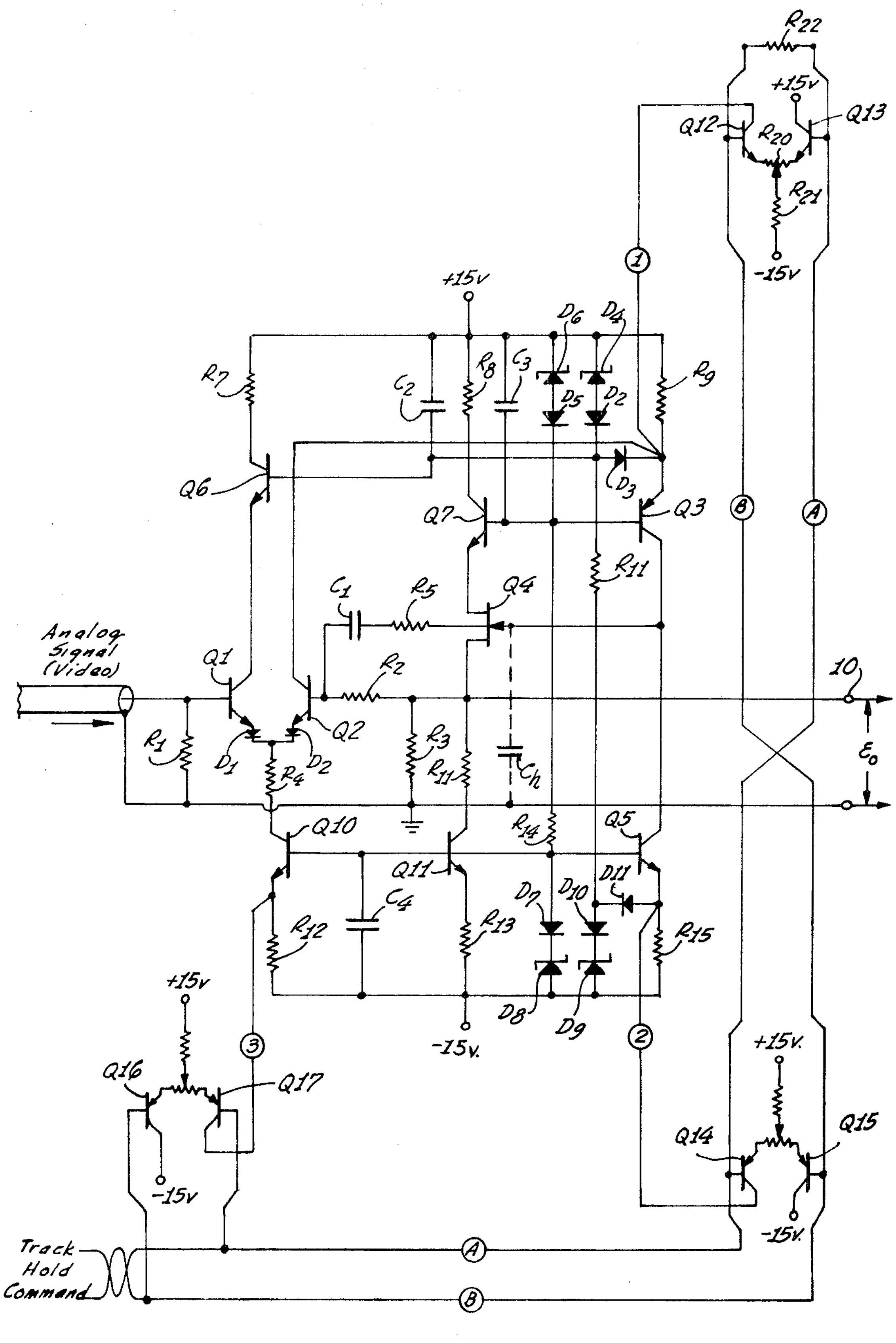
R22
+15v
Q12
Q13
R20
R21
-15v
1
+15v
D6
D4
R7
C2
R8
C3
D5
D2
R9
Q6
D3
Q7
Q3
B
A
R11
C1
R5
Q4
Analog Signal (Video)
Q1
R2
10
Q2
D1
D2
R1
R4
R3
R11
Ch
E0
R14
Q10
Q5
Q11
D11
D7
D10
C4
R12
R13
R15
+15v
D8
D9
-15v.
3
2
Q16
Q17
+15v.
Q14
Q15
-15v
-15v.
Track Hold Command
A
B

TRACK AND HOLD BUFFER AMPLIFIER

BACKGROUND OF THE INVENTION

Track and hold buffer amplifiers are known which operate to track an analog input during a track mode, and to provide an essentially constant amplitude output during a hold mode, the latter output corresponding to the last value of the analog input sensed by the system before it was switched from "track" to "hold". The resulting "hold" analog output derived from such a buffer amplifier is usually converted into a corresponding digital signal through an appropriate analog-digital converter stage.

Track and hold buffer amplfiers which operate at video rates usually rely on diode switching networks, and such systems are usually classified in the prior art as either of the open loop type or closed loop type. The open loop type of prior art track and hold buffer amplifier is usually easier to implement than the closed loop type. However, higher direct current accuracy is required in the open loop type of system than in the closed loop system. In the closed loop type of prior art system, stability around the loop is extremely difficult to obtain at the desired bandwidth for video operation.

The track and hold buffer amplifier system of the present invention has the stability of the open loop type of prior art system, and yet it operates as a closed loop system so that excessively high direct current accuracy is not required. Specifically, the improved track and hold buffer amplifier system of the present invention is constructed to include all the advantages found in the basic prior art open loop and closed loop systems, and yet to obviate the major disadvantages encountered therein.

The prior art open loop track and hold system, for example, usually requires two wide band amplifiers, the first constituting a unity gain input buffer which itself may be of the closed loop type, and the second constituting an open loop high input impedance field effect transistor (FET) unity gain follower. A diode bridge analog sampling switching circuit of the prior art open loop system is usually located between the two amplifiers. The switching circuit must float with respect to the input analog signal, since it must be isolated in a symmetrical manner about the sampled value when the system is switched from "track" to "hold".

The prior art closed loop track and hold buffer amplifier system also requires two amplifiers. This latter system also involves an input buffer and an open loop FET follower. The FET follower in the closed loop track and hold system need not exhibit as high a direct current accuracy as was the case in the open loop track and hold system. However, the input buffer amplifier in the closed loop prior art system must have high gain, and feedback must be supplied around a two amplifier loop. This leads to serious stability problems, especially when the amplifiers are compensated for video type bandwidth. The floating analog switching circuit is also required in the closed loop prior art system, as was the case in the open loop prior art system, as explained above.

The track and hold buffer amplifier system of the present invention is advantageous in that it eliminates the need for a floating analog sampling circuit. The system of the invention, as mentioned above, has the stability of the prior art open loop system, and yet it exhibits the high direct current accuracy of the closed loop prior art system.

BRIEF DESCRIPTION OF THE DRAWING

The single FIGURE is a circuit diagram illustrating one embodiment of the improved track and hold buffer amplifier of the present invention.

DETAILED DESCRIPTION OF THE ILLUSTRATED EMBODIMENT

The track and hold buffer amplifier circuit shown in the drawing comprises essentially a single wide band amplifier circuit formed by an NPN transistor Q2, a PNP transistor Q3, and a field effect transistor (FET) Q4. The wide band amplifier, as will be described, provides the function of the two amplifiers used in both the closed loop and open loop prior art track and hold systems discussed briefly above.

The transistor Q2 is connected in circuit with an NPN transistor Q1 as a usual differential current amplifier pair. The differential amplifier Q1, Q2 provides a means for detecting when the output voltage $E_o$ of the system does not equal the video analog input, during the tracking mode of the system. The transistors Q1 and Q2 also provide a control signal which corrects the deficiency, so that during the tracking mode, the amplitude of the output signal $E_o$ closely follows the amplitude of the video analog input.

The video analog input is applied across a 50 ohm resistor R1 which is connected between the base of the transistor Q1 and ground. The base of the transistor Q2 is connected to ground through a 25 ohm resistor R2, and through a 270 ohm resistor R3. The junction of the resistors R2 and R3 is connected to an output terminal 10 at which the output $E_o$ appears.

The emitters of the transistors Q1 and Q2 are connected to corresponding diodes D1 and D2 which, in turn, are connected through a 270 ohm resistor R4 to the collector of an NPN transistor Q10. The collector of the transistor Q1 is connected to the emitter of an NPN transistor Q6, whereas the collector of the transistor Q2 is connected to the emitter of the PNP transistor Q3.

The base of the transistor Q3 is connected to the base of an NPN transistor Q7. The emitter of the transistor Q7 is connected to the drain electrode of the transistor Q4. The transistor Q4, as mentioned above, is a high input and low output impedance device known as a field effect transistor (FET). The collector of the transistor Q3 is connected to the gate electrode of the FET Q4, and to the collector of an NPN transistor Q5. The source electrode of the FET Q4 is connected to the junction of the resistors R2 and R3. The gate of the FET Q4 is also connected through a 50 ohm resistor R5 to a 5 picofarad capacitor C1, the capacitor being connected back to the base of the transistor Q2.

The collector of the transistor Q6 is connected through a 270 ohm resistor R7 to the positive terminal of a 15-volt direct voltage source. The collector of the transistor Q7 is connected through a 270 ohm resistor R8 to the positive terminal, and the emitter of the transistor Q3 is connected through a 604 ohm resistor R9 to the positive terminal. The positive terminal is also connected to a capacitor C2 and to a capacitor C3. The capacitor C3 is connected to the base of the transistors Q3 and Q7, and the capacitor C2 is connected to the base of the transistor Q6 and to the junction of the diode D2 and a further diode D3. The diode D3 is connected to the emitter of the transistor Q3, and the diode D2 is connected through a Zener diode D4 to the positive terminal of the 15-volt source. A further diode D5 is connected to the base electrodes of the transistors Q3 and Q7, and through a Zener diode D6 to the positive terminal of the 15-volt source.

The transistors Q2 and Q3 are connected in a cascode connection which exhibits an extremely wide bandwidth combination. That is, the Miller capacity of the transistor Q2 is virtually eliminated because its collector voltage is clamped to a nearly constant value by the base-emitter junction of the transistor Q3. The transistor Q3 is connected as a common base stage, with respect to its collector. The FET Q4, as mentioned above, is a high input and low input impedance device. The input impedance of the FET Q4, along with the collector capacitances of the transistors Q3 and Q5, and various stray capacitances, all represented as $C_h$ constitute the hold capacity for the system during the hold mode and provide the dominant roll-off of the amplifier.

The source electrode of the FET Q4 is also connected through a 270 ohm resistor R11 to the collector of an NPN transistor Q11. The base of the transistor Q11 is connected to the base of the transistor Q10 and to a capacitor C4. The emitter of the transistor Q10 is connected to a 604 ohm resistor R12, whereas the emitter of the transistor Q11 is connected to a 1 kilo-ohm resistor R13. The resistors R12 and R13, and the capacitor C4 are connected to the negative terminal of the 15-volt direct voltage source.

The base of the transistor Q11 is connected to the base of the transistor Q5, and these electrodes are connected through a 2.2 kilo-ohm resistor R14 to the base electrodes of the transistors Q3 and Q7. The base electrodes of the transistors Q5 and Q11 are also connected to a diode D7 which, in turn, is connected through a Zener diode D8 to the negative terminal of the 15-volt source.

The emitter of the transistor Q5 is connected through a 1,210 ohm resistor R15 to the negative terminal of the 15-volt source. The negative terminal is also connected to a Zener diode D9 which, in turn, is connected to a diode D10. The diode D10 is connected through a 2.7 kilo-ohm resistor R16 to the base of the transistor Q6, and to a diode D11. The diode D11 is connected to the emitter of the transistor Q5.

The circuits described above involving the transistors Q6, Q7, Q10 and Q11 are included in the wide band amplifier to provide the required voltage and current biasing.

The system also includes a switching circuit which is connected through a lead 1 to the emitter of the transistor Q3, through a lead 2 to the emitter of the transistor Q5, and through a lead 3 to the emitter of the transistor Q10. The switching circuit responds to a track-hold command in such a way that the three electronic switches included in the switching circuit are energized for the "hold" command instantaneously to back-bias the transistors Q3, Q5 and Q10, thereby cutting off the collector current in those transistors.

The first electronic switch in the switching circuit comprises a pair of NPN transistors Q12 and Q13 connected as a differential amplifier. The collector of the transistor Q12 is connected through a lead No. 1 to the emitter of the transistor Q3. The collector of the transistor Q13 is connected to the positive terminal of the 15-volt source. The emitters of the two transistors are connected together through a balancing potentiometer R20, the armature of which is connected through an 820 ohm resistor R21 to the negative terminal of the 15-volt source. The base electrodes of the transistors Q12 and Q13 are connected together through a 100 ohm resistor R22.

The track-hold command is applied to the base electrodes of the transistors Q12 and Q13 by two leads, as shown, the levels on the two leads are compatible with emitter coupled logic (ECL). For example, during the track mode, the level on lead A is, for example, −1 volt, and the level on lead B is −2 volts; whereas during the hold mode, the level on lead A is −2 volts and the leval on lead B is −1 volt.

A similar electronic switch made up of a pair of PNP transistors Q14 and Q15 is connected through the lead 2 to the emitter of the transistor Q5. A further similar electronic switch made up of a pair of PNP transistors Q16 and Q17 is connected through the lead 3 to the emitter of the transistor Q10.

The connections are such that during the tracking mode, the three electronic switches described above are in a first mode in which the transistors Q3, Q5 and Q10 operate normally. During the resulting tracking mode, the amplifier loop of the transistors Q2, Q3 and Q4 continually adjusts the voltage at the gate of the transistor Q4 to a level such that the output voltage of the FET Q4, that is the voltage at the base of the transistor Q2, equals the input voltage at the base of the transistor Q1. In this way, the output voltage $E_o$ follows the analog video input signal with a high degree of precision.

However, when the three electronic switches are activated by the hold command, the emitters of the transistors Q3, Q5 and Q10 are instantaneously back-biased, as mentioned above, cutting off the collector current in the three devices. The FET Q4 now ceases to track the input signal, that is, the FET Q4 is effectively isolated from the analog input, since the transistors Q3 and Q5 are cut off. Also, since the input impedance of the FET Q4 is high relative to the capacitance $C_h$, the charge across the capacitance remains effectively at the last value of the analog input signal before the switching occurs. Therefore, the output $E_o$ at the output terminal 10 represents the last known value of the analog input signal prior to the switching from the track to the hold mode. The output $E_o$ represents the output of the FET Q4, and may be sampled at a relatively low output impedance level for subsequent analog-to-digital conversion.

The system described above, therefore, is constructed as a single wide band amplifier which provides the function of the two amplifiers of the prior art systems. The amplifier functions not only as an amplifier during the tracking mode, but also as a signal isolation network during the hold mode. The amplifier itself is switched into the isolation mode by the unique switching circuit described above. The holding capacitor $C_h$ is incorporated directly within the loop of the amplifier, and is used advantageously to provide the dominant roll-off.

The system described provides high degree of direct current accuracy due to its closed loop operation. The system also has excellent stability, that is, the holding capacitor $C_h$ within the loop provides the dominant 6 db/octave roll-off. The switching circuit used in the system is not floating, as is the case in the prior art systems. The amplifier components perform their normal amplifier function during the track mode, and are also used to isolate the signal during the hold mode. Leakage current in the hold mode in the system cancel to a first order of approximation. Gain of the differential input stage is switched to a low value during the hold mode by the electronic switching circuit 3 to eliminate loading and "Blowby" errors; Blowby errors being those due to capacitive coupling of the input to output during the hold mode and which affect the accuracy of the system.

It will be appreciated that although a particular embodiment of the invention has been shown and described, modifications may be made. It is intended to cover all such modifications in the following claims which fall within the spirit and scope of the invention.

What is claimed is:

1. A track and hold buffer amplifier system including:

input circuit means for receiving a video analog input signal;

a differential amplifier including first and second transistors and having a first input connected to said input circuit means;

a cascode amplifier including a third transistor and said second transistor of said differential amplifier;

a follower circuit including a device exhibiting a high input impedance and low output impedance and having an input connected to the output of said cascode amplifier and having an output connected to a second input of said differential amplifier, said follower circuit providing a control signal for said differential amplifier to maintain the output thereof at a predetermined level with respect to the amplitude of said analog input;

an output circuit connected to said output of said follower circuit; and a switching circuit connected to said transistors and responsive to a hold command for back-biasing said transistors so as to isolate said device from said analog input so that the charge across the input capacitance of said device represents the last value of the analog input prior to said hold command.

2. The amplifier system defined in claim 1, in which the device in said follower circuit comprises a field effect transistor.

3. The system defined in claim 1, in which the cascode amplifier of said second and third transistors exhibits an extremely wide bandwidth combination, and in which the collector voltage of said second transistor is clamped to nearly a constant voltage by the base-emitter junction of said third transistor so that Miller capacity of said second transistor is virtually eliminated.

4. The system defined in claim 3, in which said third transistor in said cascode amplifier is connected as a common base stage with respect to the collector thereof.

5. The system defined in claim 1, in which said cascode amplifier is connected to said follower circuit so that the collector capacitance of said third transistor cooperates with the input capacitance of said device to provide the dominant roll-off of the buffer amplifier system.

6. The system defined in claim 1, in which said switching circuit includes individual electronic switches respectively connected to the emitters of the aforesaid transistors effectively to produce a back-bias on said transistors upon the receipt of the aforesaid hold command.

7. The system defined in claim 6, in which each of said electronic switches is formed of a pair of transistors connected together as a differential amplifier.

* * * * *